UNITED STATES PATENT OFFICE.

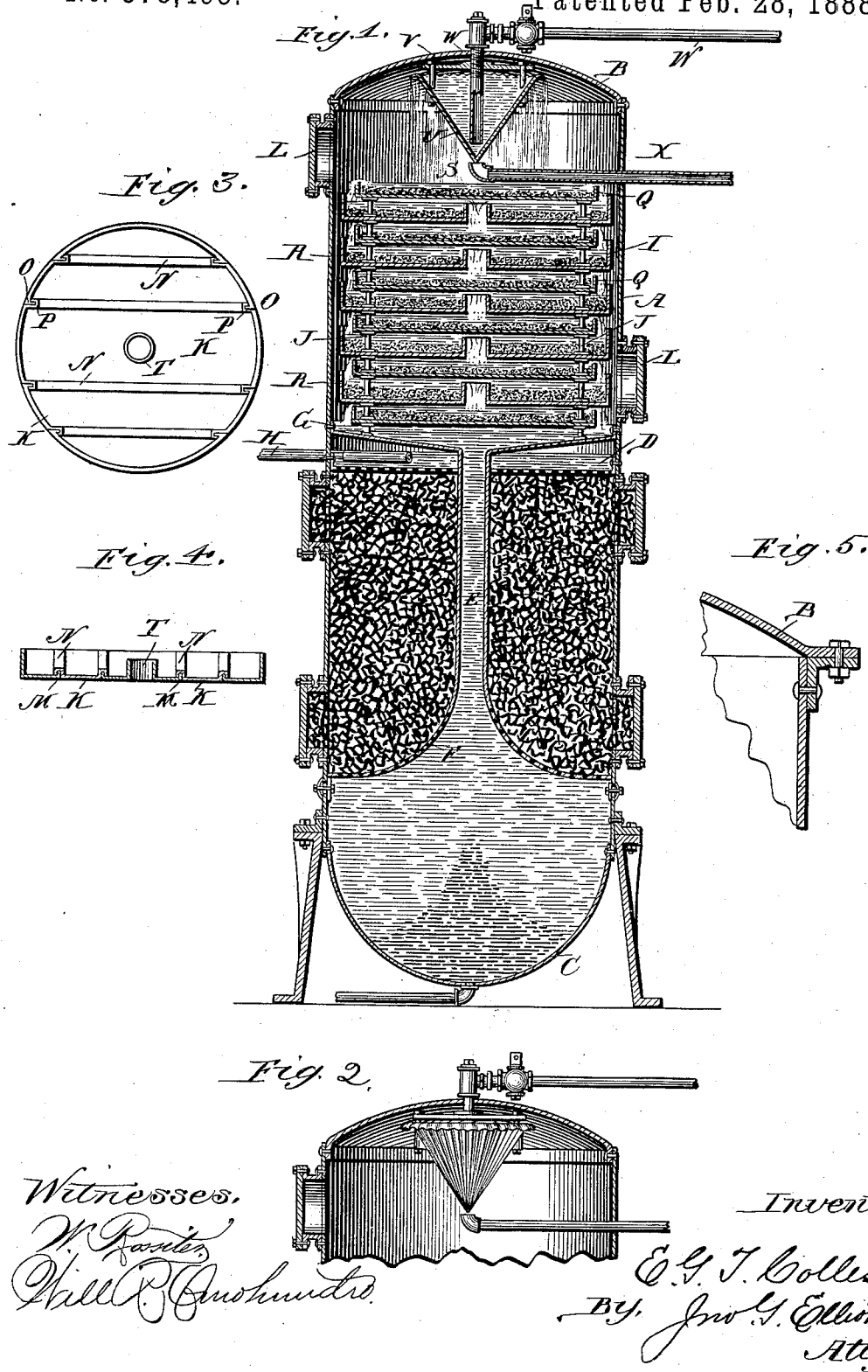

EDWARD G. T. COLLES, OF CHICAGO, ILLINOIS.

FEED-WATER PURIFIER.

SPECIFICATION forming part of Letters Patent No. 378,495, dated February 28, 1888.

Application filed February 15, 1887. Serial No. 227,662. (No model.)

*To all whom it may concern:*

Be it known that I, EDWARD G. T. COLLES, a citizen of the United States, residing in Chicago, county of Cook, and State of Illinois, have invented certain new and useful Improvements in Feed-Water Purifiers, of which the following is a specification.

This invention relates to improvements in feed-water purifiers in which live steam is employed to raise the temperature of the water and at the same time induce the precipitation of scale-forming and other impurities suspended in said water.

In the prior constructions an objectionable feature is the manner of introducing the feed-water into the steam-chamber, generally through perforations or slots formed in the feed-water pipe, to the end of which is screwed or otherwise rigidly secured a dish-shaped pan into which the water first falls, and then overflows onto the series of flat pans underlying the same; but practice has demonstrated that these perforations or slots soon become filled with the lime and other scale-forming substances, so that the feed-water cannot be forced therethrough, and if this does not first result the perforations will eventually be stopped up by the deposits made in the bottom of said pan, thereby necessitating the removal of the cap or covering of the heater in order to relieve the pipe of its obstructions.

Another and more serious objection to the prior constructions is the manner of discharging the feed-water into the heater, the exposure of the end of the feed-pipe to the back-pressure of the steam being particularly disastrous when live steam is used, for the strain of each stroke of the feed-pump will follow the water into the feed-pipe, become instantly condensed, and thereby produce a vacuum into which the water at the next stroke of the pump rushes with great force, resulting in a violent concussion which frequently disconnects or splits the feed-pipe, and practice has demonstrated that the use of a check-valve in the feed-pipe is not sufficient to obviate this difficulty, the check-valve itself soon becoming injured beyond usefulness by the frequently-recurring concussions.

Still another objection to the prior constructions is the rigid connection between each pan of the series located in the steam-chamber or between the said pans and their common support, which necessitates the removal of all the pans in a body and renders the ready removal of each pan independent of the rest an impossibility, and this construction also renders necessary the removal of the heater-cover whenever the pans are to be removed.

The prime object of this invention is to have a series of sediment-pans located in the steam-chamber and detachably connected together in such manner that the pans may be separately removed, and to have such pans composed of sections detachably connected together, whereby they may be removed and replaced through man-holes, of a less diameter than the pans, provided in the heater for this purpose, and the necessity for the removal of the heater-cover thus be avoided.

Other objects are to provide means for introducing the feed-water into the steam-chamber in such manner that the clogging of the opening in the feed-water pipe is rendered impossible; to prevent steam from entering the feed-water pipe; to provide a seal for the mouth of said pipe, whereby not only is the feed-water relieved of back-pressure from the steam, but the necessity of employing a check-valve in said pipe is avoided, and to so construct the deflector or spreader that the water shall not only carry the precipitations out of said deflector, but will be spread out into a thin sheet form in its fall from said deflector to the series of sediment-pans below and be subjected to the direct action of a body of live steam discharged within the surrounding sheet of water, whereby the impurities contained in the water are more quickly and thoroughly removed. I attain these objects by devices illustrated in the accompanying drawings, in which—

Figure 1 represents a central vertical section of a purifier embodying my invention; Fig. 2, a similar view of a portion of said heater, showing the deflector or spreader and its pipe-connection in side elevation; Fig. 3, a detail plan view of one of the sediment-pans; Fig. 4, a central vertical section thereof, and Fig. 5 a detail view showing a modified construction of the heater in which the cover thereof is removable.

Similar letters of reference indicate the same parts in the several figures of the drawings.

Referring by letter to the accompanying drawings, A indicates an upright cylindrical receptacle, such as is commonly used in feed-water heaters, supported upon the usual legs, provided with end caps or cover and bottom, B C, respectively, either one or both of which may be rendered readily removable by the construction shown in Fig. 5, which is especially designed for use in connection with heaters of small capacity. This receptacle A is divided into two main compartments by a perforated partition, D, riveted or otherwise rigidly secured to the walls thereof, the lower compartment being again divided into two chambers by a pipe, E, leading downwardly from the partition D, the lower end of which pipe at F, about midway the lower chamber, flares outwardly to the walls of the receptacle, thus forming a chamber between the flaring ends of said pipe and the partition D, which, when filled with charcoal, coke, or other suitable material, constitutes a filtering-chamber, while the lower half of the chamber, between said pipe and the bottom of the heater, constitutes a combined water and sediment chamber. The flaring portion of said pipe at F is perforated, as shown, so as to permit the passage of the water from said chamber into the filtering-chamber.

The upper end of the pipe F projects a short distance above the perforated partition D, where its end is formed into a funnel-shaped dish or partition, G, extending to the surrounding walls of the heater, to which it is connected by rivets or otherwise, thus forming a small water-chamber between said dish and the perforated partition D, into which passes the filtered and purified water and from which the water is drawn off and conducted to the boiler through the pipe H, projecting therein through the wall of the heater.

The upper part of the receptacle between the partition G and the cover B constitutes the steam-chamber of my heater, into which the water is first introduced and subjected to the action of steam, and in this chamber is located a series of sediment-pans, I, placed one above the other and supported in their relative positions and at a suitable or uniform distance apart by means of short posts J', each of which, although having no connection with either pan, is supported by the pan beneath it, and in turn supports the one above it, the lowermost set of posts resting upon the partition G, upon which the weight of all the pans is borne. Such a construction renders the pans independently removable from the heater—that is to say, the pans may be removed therefrom and replaced therein one at a time—which construction is especially useful when it is desired to empty the pans of the sediment deposited therein, which in the prior construction, in which the series of pans is formed into a single body, is rendered difficult and almost impossible in view of such construction; and to avoid the necessity for cleansing said pans of sediment the escape-openings therein have been so located that the pans do not serve in the capacity of sediment-collectors at all, but simply as heating-pans to produce a greater superficial area of the water-surface and consequently expose the water to the action of the steam for a greater length of time. These sediment-pans, for the purpose of their more ready removal and to at the same time enable their removal from the heater without the necessity of first removing the cap or cover of the heater, are formed into sections or parts K K, as clearly shown in Figs. 4 and 5, which parts are of a slightly less diameter than the man-holes L, formed in the walls of the heater, as shown, through which said sections may be removed one at a time. The sections may be united together by any suitable detachable connection which will permit of their separation and removal through the man-holes; and for the purpose of illustration I have shown in the drawings a simple and effective means for producing this result, consisting of an upwardly-turned flange, M, on one section overlapped by an arch or bent flange, N, formed on the adjoining section, and similar flanges, O P, formed on the upturned rim of side of each section of the pan, by means of which the sections can be readily separated from each other by lifting any one or more in a vertical direction. The joints between the sections of the pans would in a very short while become sealed by the sediment deposited therein.

Each alternate pan Q of the series is of a less diameter than the pan next below and above it, so that water overflowing from these pans would fall into the larger pans, R, next below, from which it in turn escapes through openings S, formed about the center of said pans, into the smaller pans, Q, below the said openings, being surrounded by an upwardly-projecting flange or short length of pipe, T, which projects upwardly from the bottom a sufficient height to give the water a depth in the pan of several inches, but has its end lie in a plane below the rim of the pan, so that the water in said pan will overflow through said pipe. This arrangement of the pan gives the water a tortuous passage through the steam-chamber, conducting it from the center, first outwardly to the outer edge of the pan, thence downwardly to the next pan, and back toward the center of this pan, whence it escapes to the next pan below, which operation is repeated continuously until the water has passed through the steam-chamber; and as a result of the long-continued subjection of the water in thin sheets to the heat of the steam not only is the temperature of the water raised to a high degree, but most of the sediment contained therein is separated therefrom and precipitated in the sediment-pans before the water reaches the main water-chamber in the lower part of the heater, where the sediment has usually been deposited in heaters as heretofore constructed, and as a consequence been continually stirred up and carried into the filtering-chamber by the influx therein of the feed-water from the steam-chamber.

Another feature of my invention is the deflector or spreader U, located in the upper end of the steam-chamber, and having the shape of an inverted cone, said spreader being secured, by bolts or otherwise, to a cross-arm, V, screwed or otherwise secured about the center of its length to the end of the feed-water pipe W, projecting downwardly through the cap or cover of the heater, said pipe terminating as near as possible to the interior apex of the hollow cone-shaped spreader. The exterior surface of this spreader, as well as the top edge thereof, is corrugated or fluted, so as to divide the water into numerous small streams in its overflow from said spreader and to prevent the water flowing in one body over one side of the spreader should it or the heater be accidentally set out of plumb.

The open end of the feed-water pipe absolutely insures said pipe from choking, while the projection of this end into the bottom corner of the spreader, where it is surrounded on all sides by inclined diverging walls, prevents the accumulation of sediment in said spreader to an extent that would be liable to close the end of said pipe, for the constant influx of feed-water would carry all such sediment up the inclined walls of the spreader and over the edge thereof into the sediment-pans beneath.

Steam is admitted into the steam-chamber through the pipe X, which opens at the apex of the spreader in the center of the circular sheet of water overflowing from said spreader, and in such manner as to exert an expansive force upon said water, which materially aids the process of separation. The peculiar arrangement of the feed-pipe and deflector also serves an important purpose, in that the water contained at all times in the latter acts as a seal for the said pipe, and not only relieves said pipe from the back-pressure of steam, but also effectually prevents the entrance of steam into the said pipe, which would be particularly disastrous if live steam were used in connection with the heater, for the reasons hereinbefore stated, and it is obviously unnecessary with such a construction to employ a check-valve in the feed-pipe; hence the advantage of introducing the water into the heater in such manner that the steam is prevented at all times from entering the water-supply pipe is, that live steam or steam at boiler-pressure may be used in my heater, resulting in a large precipitation of impurities and greater temperature of the feed-water than is possible in any heater in which the water is not so introduced, for in such devices only exhaust-steam can be practically used.

So far as my invention is directed to preventing the steam entering the feed-water pipe, the deflector may be of any other form than that shown and the steam may be admitted at any point into the heater.

In Fig. 5 I have illustrated a modified form of the heater, in which the cap or covering is made removable for use in connection with heaters of small capacity, wherein the man-holes for removing the sectional pans is not practical, or in cases where it is not desired to employ the sectional pans.

Having described my invention, what I claim, and desire to secure by Letters Patent, is—

1. In a live-steam purifier, a series of sediment-pans located in the steam-chamber and detachably connected together, each of said pans being composed of sections detachably connected together, substantially as described.

2. In a live-steam purifier, the steam-chamber and man-holes provided with removable caps opening therein, in combination with a series of sediment-pans located in said chamber detachably connected together, and each of said pans composed of sections detachably connected together and of a width less than the diameter of said man-holes, substantially as described.

3. In a live-steam purifier, a deflector or spreader suspended in the steam-chamber and having the shape of an inverted hollow cone, in combination with an open-ended feed-water pipe projecting into said spreader, substantially as described.

4. In a live-steam purifier, a deflector or spreader suspended in the steam-chamber and having the shape of an inverted hollow cone, in combination with an open-ended feed-water pipe projecting into said spreader, and a steam-pipe opening on the apex of said cone-shaped spreader, substantially as described.

EDWARD G. T. COLLES.

Witnesses:
WILL R. OMOHUNDRO,
A. McIVER.